Feb. 16, 1932.   C. E. COCHRAN   1,845,043
INDUSTRIAL TRUCK
Filed April 8, 1925   3 Sheets-Sheet 1

Feb. 16, 1932.　　C. E. COCHRAN　　1,845,043
INDUSTRIAL TRUCK
Filed April 8, 1925　　3 Sheets-Sheet 2

Inventor
Clyde E. Cochran
By Bates, Macklin, Golrick & Teare
Attorneys

Feb. 16, 1932.            C. E. COCHRAN            1,845,043
                          INDUSTRIAL TRUCK
                    Filed April 8, 1925      3 Sheets-Sheet 3

Patented Feb. 16, 1932

1,845,043

UNITED STATES PATENT OFFICE

CLYDE E. COCHRAN, OF CLEVELAND, OHIO, ASSIGNOR TO THE ELWELL-PARKER ELECTRIC COMPANY, OF CLEVELAND, OHIO, A CORPORATION OF OHIO

INDUSTRIAL TRUCK

Application filed April 8, 1925. Serial No. 21,487.

This invention is concerned with industrial trucks and more particularly with appliances adapted to be attached to such trucks to facilitate the handling and transportation of loads.

The general object of my invention is the provision of a load engaging mechanism in association with an industrial truck for retaining the load upon the mechanism in a transportable position.

A further object of my invention is the provision of an industrial truck of the character referred to in combination with a load engaging and elevating means arranged at one end of the truck by which the truck may be brought into engagement with a load such as loose stacks of sheet metal by simple manipulation thereof; the mechanism being such that a stack of sheets may be engaged and tilted to cause the stack to be supported along the sheet edges as well as at the normal bottom of the stack, and the stack after being transported may be elevated to a tiered position or lowered to the floor as desired. A still further object of my invention is the provision of a novel load engaging elevating and tilting mechanism particularly for use on industrial trucks.

A further object is the provision of a method of handling unbound stacks of sheet metal, whereby the stacks may be lifted, and the edges of the sheets may be "evened up" or decked at one side of the stack, and the stack thereafter may be transported and then tiered in relation to other stacks or lowered to the floor as desired.

Other objects of my invention will be hereinafter set forth in the following description referring to the accompanying drawings which illustrate a preferred form thereof. The essential characteristics are summarized in the claims.

Figure 1:
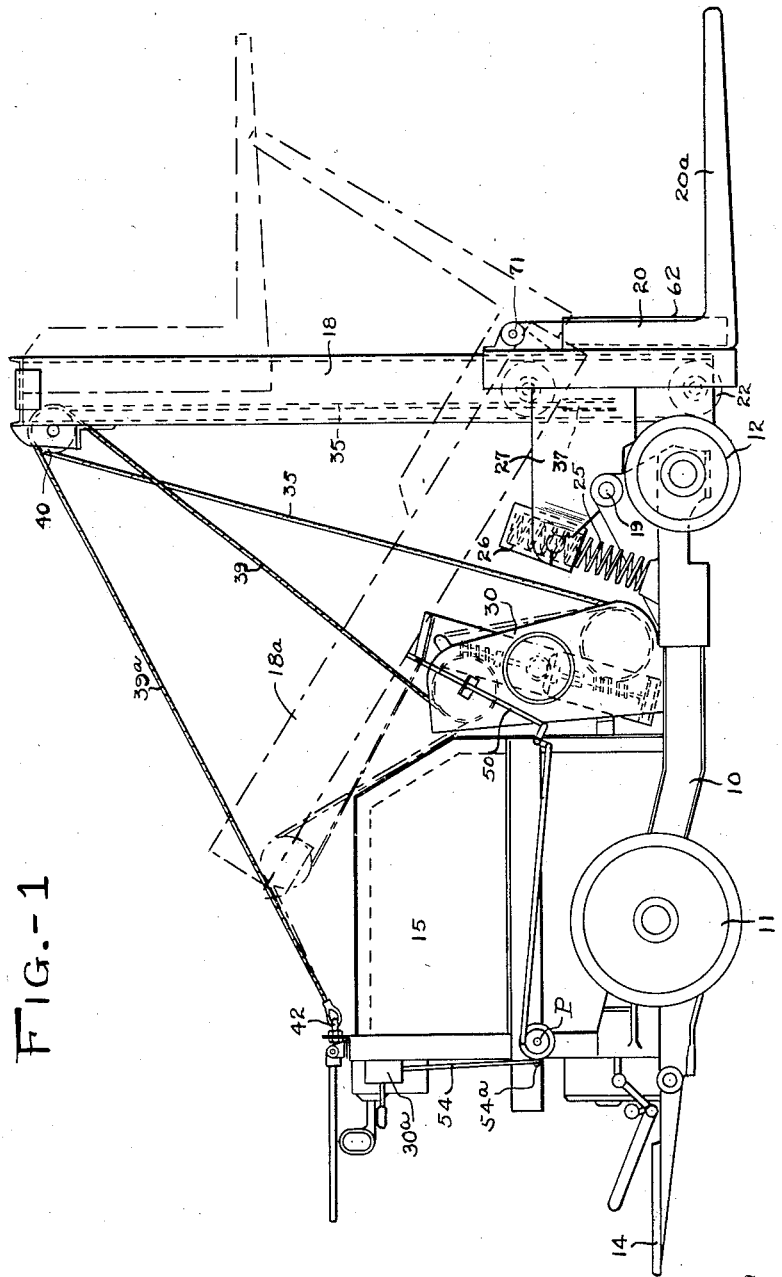
Figure 2:
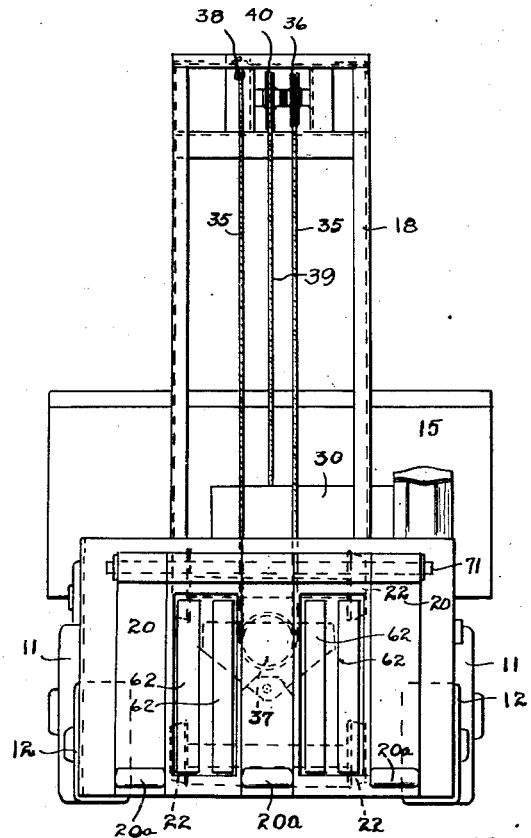
Figure 5:
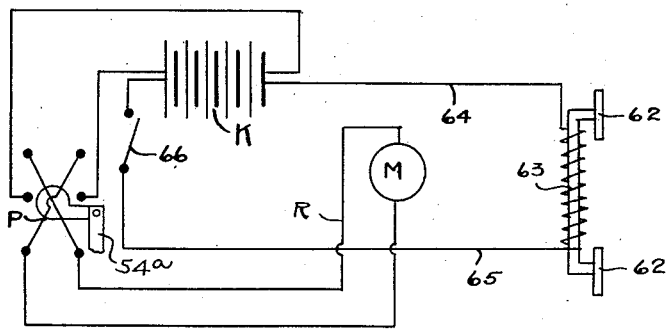
Figure 4:
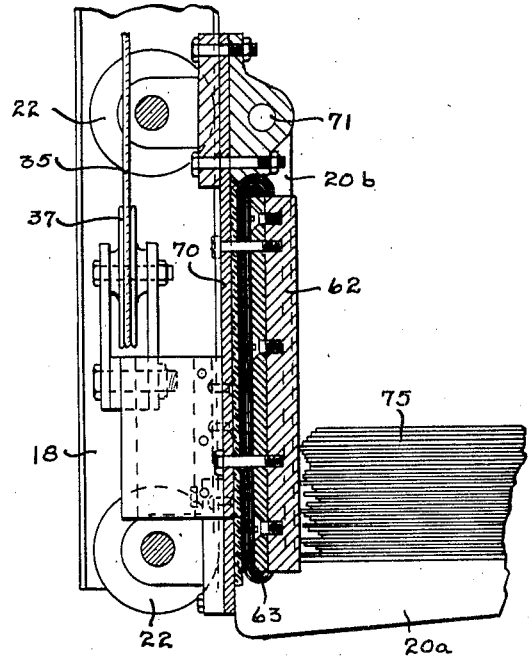
Figure 3:
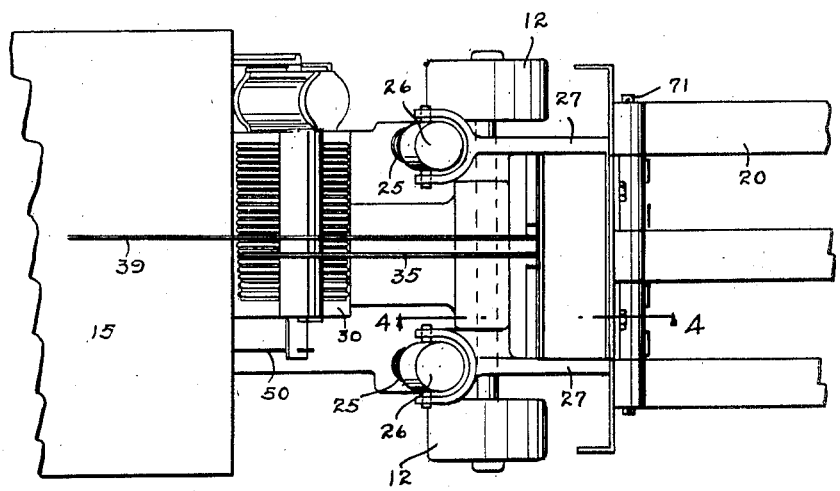

In the drawings Fig. 1 is a side elevation of an industrial truck embodying the several features of my invention; Fig. 2 is a rear end view of the truck; Fig. 3 is an enlarged fragmentary plan view showing the load engaging means mounted on the ends of the truck; Fig. 4 is an enlarged cross-sectional elevation taken substantially along the lines 4—4 of Fig. 3; Fig. 5 is an electrical diagram showing an electrical control arrangement for a mechanism comprising a part of my invention.

The form of my invention herein disclosed is particularly adaptable to the fulfilling of my method of handling and transporting sheet material, such as sheet metal. Various mechanisms have been placed upon industrial trucks of the character referred to for engaging bundles of sheet metal to retain such bundles of sheets in position on the truck while being transported. However many difficulties arise in handling a product of this character, particularly the sheet stock which has not been bundled or bound. For instance when the top and bottom of the bundle are engaged by some sort of a grappling or gripping mechanism, the air imprisoned in the stack between the individual sheets is forced out, thus causing a shifting of the sheets. In other words when this method of handling the bundle is used, the air acts as sort of a lubricant between the sheets thus causing a slipping or shifting thereof when the bundle is positively gripped.

I propose to provide a load engaging and tilting mechanism which may engage an unbundled or untied bundle of sheet metal and transport it while retaining the sheets in bundle form by the use of a sheet decking means closely associated with the elevating mechanism and mounted thereon to lie immediately adjacent the edges of the metallic sheets.

Thus in Fig. 1, I show an industrial truck having a chassis or frame 10 mounted on the usual motor driven dirigible wheels 11 at the rear end thereof while the front end is mounted on relatively small load supporting wheels 12. A platform 14 is provided at the rear of the truck for supporting the operator and various controls extend rearwardly to this position whereby complete manipulation of the truck and the elevating mechanism may be effected from such position. A battery housing 15 contains the batteries which are the source of power for the motor, not shown, which drives the wheels 11, and this housing is disposed at the rear of the truck to counter-balance overhanging loads at the front of the truck.

Mounted on the chassis or frame 10 of the truck adjacent the forward end thereof, is an upright frame 18 pivotally supported at 19 on the truck chassis. The upright frame comprises a trackway for a load elevating platform in the form of an L-shaped frame 20. The L-shaped frame is mounted upon a carriage member 70 provided with rollers 22 to engage the upright frame in a suitable manner to serve as an anti-friction means when the frame 20 traverses the upright frame. The upright frame 18 may swing about the pivot 19 to an upright position, and may be tilted rearwardly to the dot and dash position shown in Fig. 1 against the reaction of buffers or spring members 25 disposed to engage the truck chassis 10. The buffer springs shown are seated in buffer retainers 26 which pivotally engage side plate members 27 comprising an off-set structure for pivotally mounting the upright frame 18 on the front end of the chassis 10.

The elevating movement of the load engaging platform 20 and the tilting movement of the upright frame 18 may be effected by separately operated cable members actuated by a motor driven double drum winding mechanism 30, controlled from the operator's position by a suitable controller unit 30a. Such a cable 35 may extend upwardly over sheave 36 mounted at the top of the tilting frame 18 and thence downwardly over a sheave 37 suitably attached to the elevating platform 20 and thence upwardly to an anchoring bolt 38 secured to the top of the frame.

Tilting movement of the upright frame 18 against the force of the spring 25 may be effected by a drawing in of the cable 39 which extends upwardly over a sheave 40 attached to the upper structure of the upright frame 18, thence rearwardly as at 39a to an anchoring bolt 42 attached to the extreme rear end of the truck, the angle between the portion 39a of the cable and the tilting frame being greater than the angle made by either of the stretches of the cable 35 and the tilting frame, whereby the end of the cable 39 of the winding mechanism can effect a full tilting movement of the upright frame and load carrying platform to the dot and dash position shown in Fig. 1 at 18a. It can be observed in this figure that the position of the pivotal connection of the upright frame, relative to the truck frame and battery housing may be moved through a substantial angle, to cause the sheets, carried by the stock engaging arms 20a of the L-shaped frame 20, to slide relative to each other and be decked or evened up against the members 62, which may be carried by the carriage plate 70 in a position to thus support the sheets on edge.

The winding mechanism 30 may comprise a double drum and single motor actuated mechanism such as is disclosed in the application of Edward Abbe on a winding mechanism, Serial No. 615,203 filed January 27, 1923, which application has been assigned to my instant assignee and which is now Patent No. 1,688,131, dated October 16th, 1928, and the disposition of the winding is such as to be operatively effective in actuating the upright frame and carriage thereon while permitting a full inward swing of the upright frame.

A safety appliance for preventing an overtilting tendency of the cable 39 may be provided to react on the controllers when the upright frame has been swung to an extreme tilted position such as shown in Fig. 1. Such a mechanism may comprise a bumper rod 50 disposed to contact with a flange of one of the upright members comprising the frame, and this rod by a series of crank connections actuates a rod 54 which opens the controller switch to the motor actuating the winding mechanism 30.

In Fig. 5 I show a wiring diagram which illustrates the operation of the safety device referred to. M represents the motor for actuating the drum, acting on the tilting cable 39. The motor is connected to the battery through a line R controlled by a double control switch P. This double control switch may be opened by the actuating mechanism 54 which is pivotally connected to the switch actuating arm as indicated at 54a on Fig. 1 and can be manually controlled to reverse the poles and thus reverse the operating of the winding mechanism.

If desired an electro-magnetic device for holding the sheets when once decked may be provided which may comprise pole plates 62 having suitable winding 63 shown in Figs. 2 and 4 which may be connected by an electric circuit, which may include a flexible cable of such length as to permit the travel of the carriage in the trackway to the battery plates as shown in the wiring diagram of Fig. 5 to effect a direct line connection 64 and 65. A switch 66 is provided to be disposed at the forward end of the truck near the driver's position. As shown in Fig. 2 the disposition of the pole pieces 62 is between L-shaped arms 20a comprising the load lifting means of the member 20. The pole pieces may be carried or mounted directly upon the carriage plate 70 upon which are mounted the anti-friction rollers 22. The arms 20a may also be pivotally mounted upon the back plate 70 as shown at 71 in Fig. 4, whereby they may swing in the event the load elevating means is lowered into contact with any solid obstruction.

The thickness of the pole pieces relative to the thickness or width of the upright portion 206 of the arms 20a would be the same as the thickness of the members 60 when used, that is, this thickness is such that the pole pieces will extend outwardly a slight distance, whereby they may constitute a stacking means acting directly against the edges of the sheets of metal in the bundle 75. The bundles are usually disposed upon blocks which are spaced apart to permit the truck to be maneuvered to bring the arms 20a beneath the bundle of sheets, whereupon a slight elevation of the arms will lift the bundle. When the pole pieces 62 are electrically energized, the magnetic action is such that the stack of sheets are attracted to the load elevating frame and to each other with the result that the stack of sheets can be handled by the truck in a very convenient manner as if the stack were already bundled or bound together, and this handling may be effected regardless of the amount of air existing therebetween. If it is desired to deck the sheets this can be accomplished by swinging the upright frame inwardly over the truck frame to cause one edge of the respective sheets to contact with the members 62, as the case may be.

From the foregoing description of my invention, it will be seen that I provide a load engaging means on an industrial truck of the character referred to which means not only has a straight vertical movement relative to the truck frame, but also a tilting movement, both movements of which prove to be effective in the handling for instance of sheet stock. Such means has proven to be efficient in the carrying out of my particular method of engaging loose stacks of sheet stock and transporting it to a new location, and if it is desider to tier the stock it may be decked by inclining the sheets after which they may then be tiered by operating the frame 18 to an upright position, whereupon the carriage may then be elevated.

I claim:

1. In an industrial truck having a low slung frame portion and a battery housing portion, the combination of a load tiering means mounted upon a normally upright vertically disposed tiltable frame, said tiering means including ways carried by the tiltable frame and a load elevating carriage mounted for movement in said ways, said tiltable frame being pivotally attached adjacent the rear end of the truck frame to swing about a fixed transverse axis relative to the truck frame, the load tiering means having an overhanging portion relative to the tilting frame adapted to be disposed adjacent the floor of the truck supporting medium to engage the bottom of a load, a hoisting mechanism mounted on the truck frame and attached to the load elevating carriage for moving the carriage the full length of the tiltable frame, said hoisting mechanism including a cable extending from adjacent the lower portion of the truck frame, upwardly over a guide disposed adjacent the top of the tiltable frame and downwardly to a connection with the carriage, and a second hoisting mechanism including a cable passing over a sheave attached to the top of the tilting frame and extending to an anchor connection with the truck frame adjacent the forward end thereof, and power operated means for operating the said cables.

2. In an industrial truck, the combination of a truck frame, a normally upright vertically disposed frame tiltably mounted adjacent one end of the truck, said tiltable frame including a guideway, a load engaging carriage mounted for a raising and lowering movement in the guideway, a flexible member having one stretch running from the carriage to a guide adjacent the upper portion of the tilting frame and a second stretch running from the guide to a point adjacent the truck frame, power actuated means associated with the flexible means to cause the latter to raise and lower the carriage, a second flexible means having one stretch running from a point adjacent the truck to the upper portion of the tiltable frame and disposed a greater angular distance from the tiltable frame than does the first flexible means.

3. In an industrial truck, the combination of a truck frame, a normally upright vertically disposed tiltable frame including a normally vertical guideway, a load engaging carriage mounted for vertical movement in the guideway, flexible means passing from the carriage to a guide adjacent the top of the tiltable frame and thence to the point adjacent the truck frame, power operated means associated with the flexible means to cause a raising or lowering movement to be imparted to the carriage, a second flexible means having a stretch running from a point adjacent the frame of the truck to a point adjacent the upper end of the tiltable frame and being disposed above the first named flexible means, and a power operated means associated with the second flexible means to cause the tilting of the tiltable frame.

4. In an industrial truck, the combination of a truck frame, a normally upright vertically disposed and operatively tiltable frame mounted adjacent the rear end of the truck, said tiltable frame including a guideway, a load engaging carriage mounted for up and down movement in said guideway whereby said carriage may traverse substantially the entire length of the guideway, flexible means passing from the truck frame over a guide adjacent the top of the tilting frame and to the carriage to raise and lower the carriage, flexible means secured to the truck adjacent the front end thereof and passing around a guide adjacent the top of the tilting frame to tilt the frame, said means being arranged to tilt the frame to an inclined position substantially over the truck, power means adapted to operate said flexible means, and resilient means acting on the tiltable frame to normally maintain it in an upright position when the first named flexible means is being operated, but permitting the frame to be tilted when the second named flexible means is being operated.

In testimony whereof, I hereunto affix my signature.

CLYDE E. COCHRAN.